United States Patent
Lavallee

(10) Patent No.: US 10,875,622 B2
(45) Date of Patent: Dec. 29, 2020

(54) COMPACT CABIN DOOR INTERFACE TO INCREASE VISIBILITY

(71) Applicant: Bell Helicopter Textron Inc., Fort Worth, TX (US)

(72) Inventor: Yann Lavallee, St-Hippolyte (CA)

(73) Assignee: Textron Innovations Inc., Providence, RI (US)

( * ) Notice: Subject to any disclaimer, the term of this patent is extended or adjusted under 35 U.S.C. 154(b) by 310 days.

(21) Appl. No.: 15/878,329

(22) Filed: Jan. 23, 2018

(65) Prior Publication Data

US 2019/0225316 A1 Jul. 25, 2019

(51) Int. Cl.
*B64C 1/14* (2006.01)
*B64C 27/04* (2006.01)

(52) U.S. Cl.
CPC ............ *B64C 1/1461* (2013.01); *B64C 1/143* (2013.01); *B64C 1/1423* (2013.01); *B64C 1/1492* (2013.01); *B64C 27/04* (2013.01)

(58) Field of Classification Search
CPC ..... B64C 1/1423; B64C 1/143; B64C 1/1461; B64C 1/1492; B64C 27/04; B64C 1/1407
USPC ..................................................... 244/129.5
See application file for complete search history.

(56) References Cited

U.S. PATENT DOCUMENTS

| | | | |
|---|---|---|---|
| 1,796,242 A | 3/1931 | Cooper | |
| 2,797,884 A * | 7/1957 | Peed, Jr. ............... | B64C 1/1407 244/129.5 |
| 4,220,298 A | 9/1980 | Willis | |
| 5,096,238 A * | 3/1992 | Mintz ....................... | E05C 9/02 292/35 |
| 5,348,778 A * | 9/1994 | Knipp ....................... | B32B 3/06 312/400 |
| 6,401,398 B1 * | 6/2002 | Panayides ................ | B64C 1/14 49/498.1 |
| 9,090,329 B2 * | 7/2015 | Sumner ................. | B64C 1/1407 |

(Continued)

FOREIGN PATENT DOCUMENTS

| | | |
|---|---|---|
| CN | 202249636 U | 5/2012 |
| EP | 0645517 A1 | 3/1995 |
| EP | 2439135 A1 | 4/2012 |

OTHER PUBLICATIONS

European Search Report in related European Application No. 18212462.8 dated May 14, 2019, 5 pages.

(Continued)

*Primary Examiner* — Claude J Brown
(74) *Attorney, Agent, or Firm* — Lightfoot & Alford PLLC

(57) ABSTRACT

Systems and methods include providing an aircraft with a fuselage, an airframe that provides structural rigidity to the fuselage, and at least one door that allows access to an interior of the fuselage through an opening in the fuselage. The aircraft includes an overlapping, tongue and groove door interface formed between a frame of the door and a portion of the airframe that at least partially borders the opening in the fuselage. At least a portion of the airframe includes a concavity. At least a portion of the door frame includes a complementary shaped profile to the concavity of the airframe. The complementary profile of the door frame and the concavity of the airframe form a seal between the door frame and the airframe when the complementary portion is at least partially received within the concavity by selectively rotating the door to its closed position.

18 Claims, 4 Drawing Sheets

(56) References Cited

U.S. PATENT DOCUMENTS

| | | | | |
|---|---|---|---|---|
| 2007/0151180 A1* | 7/2007 | Pace | ............... | E04F 19/02 |
| | | | | 52/287.1 |
| 2012/0085033 A1* | 4/2012 | Krahl | ............... | B64C 1/1492 |
| | | | | 49/141 |
| 2012/0085865 A1* | 4/2012 | Gorgoglione | ......... | B64C 1/1461 |
| | | | | 244/129.5 |
| 2012/0227325 A1* | 9/2012 | Diamant | ............... | B60J 1/16 |
| | | | | 49/149 |
| 2018/0170512 A1* | 6/2018 | Fischer | ............... | B64C 1/1461 |

OTHER PUBLICATIONS

European Exam Report in related European Application No. 18212462.8 dated May 28, 2019, 7 pages.
European Exam Report in related European Application No. 18212462.8 dated Nov. 13, 2019, 4 pages.

* cited by examiner

COMPACT CABIN DOOR INTERFACE TO INCREASE VISIBILITY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Traditional aircraft and/or other vehicles are often constructed from a combination of structural components and other components to provide maximum structural rigidity and function to the aircraft and/or other vehicle. However, the size and/or location of some components may drastically reduce the visibility of the pilot of an aircraft and/or operator of other vehicle.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
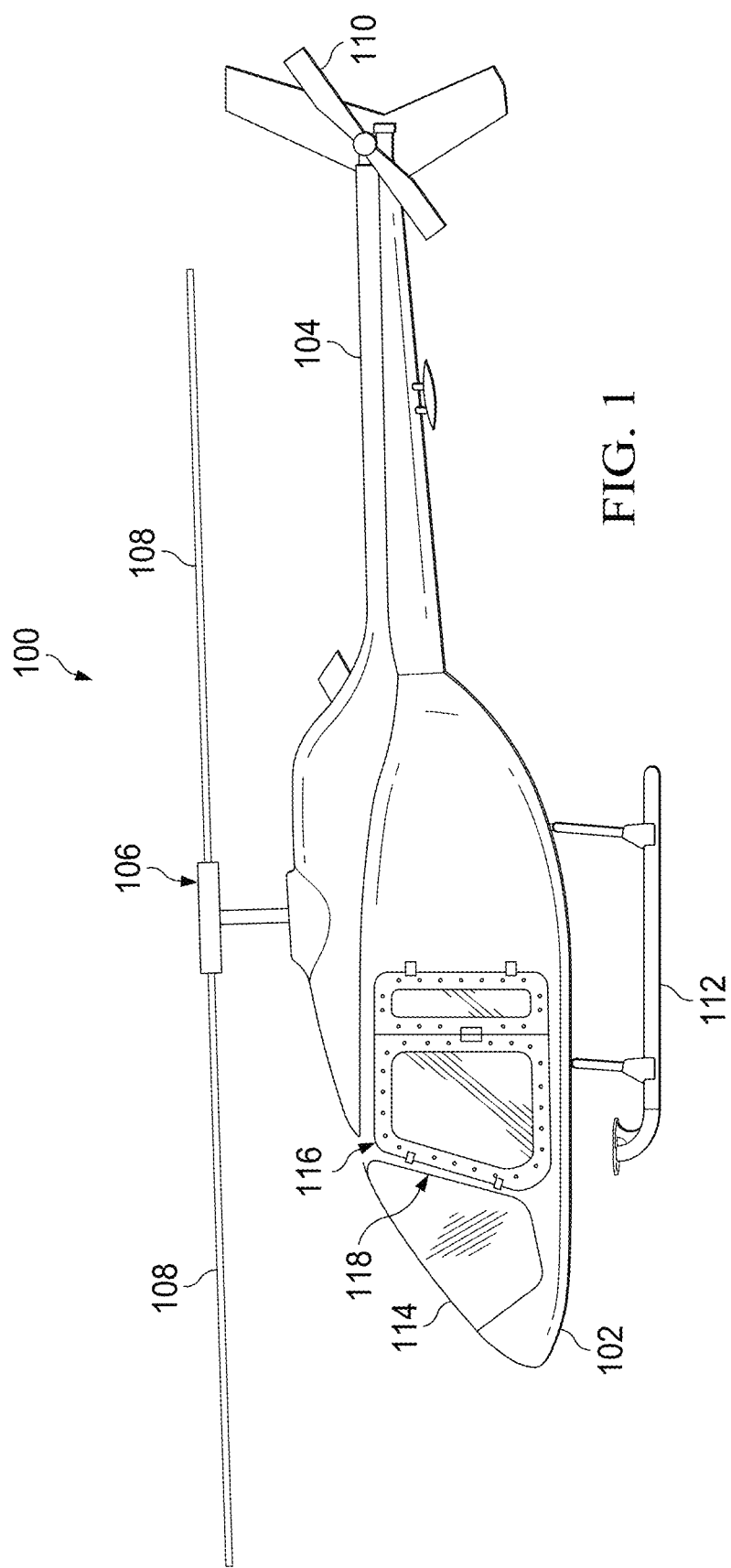
FIG. 1 is a side view of an aircraft according to this disclosure.

Referring now to FIG. 1, a side view of an aircraft 100 is shown according to this disclosure. Aircraft 100 is a helicopter. However, it will be appreciated that aircraft 100 may be any other type of aircraft (e.g. fixed-wing aircraft, vertical takeoff and landing (VTOL) aircraft, etc.). Aircraft 100 comprises a fuselage 102, an empennage 104 having a tail rotor 110, and a rotor system 106 comprising a plurality of selectively rotatable rotor blades 108. Aircraft 100 also comprises a landing gear 112 extending from the fuselage 102. Additionally, aircraft 100 comprises a windshield 114 configured to allow visibility of the outside environment from an interior of the aircraft 100. Furthermore, aircraft 100 also comprises at least one cabin door 116 configured to allow ingress and egress of a pilot and/or other personnel into the interior of the aircraft 100. As such, it will be appreciated that aircraft 100 may comprise one or more doors 116 on each side of the aircraft 100 depending on the configuration and/or design of the aircraft 100. Aircraft 100 also comprises a pillar 118.

Figure 2:
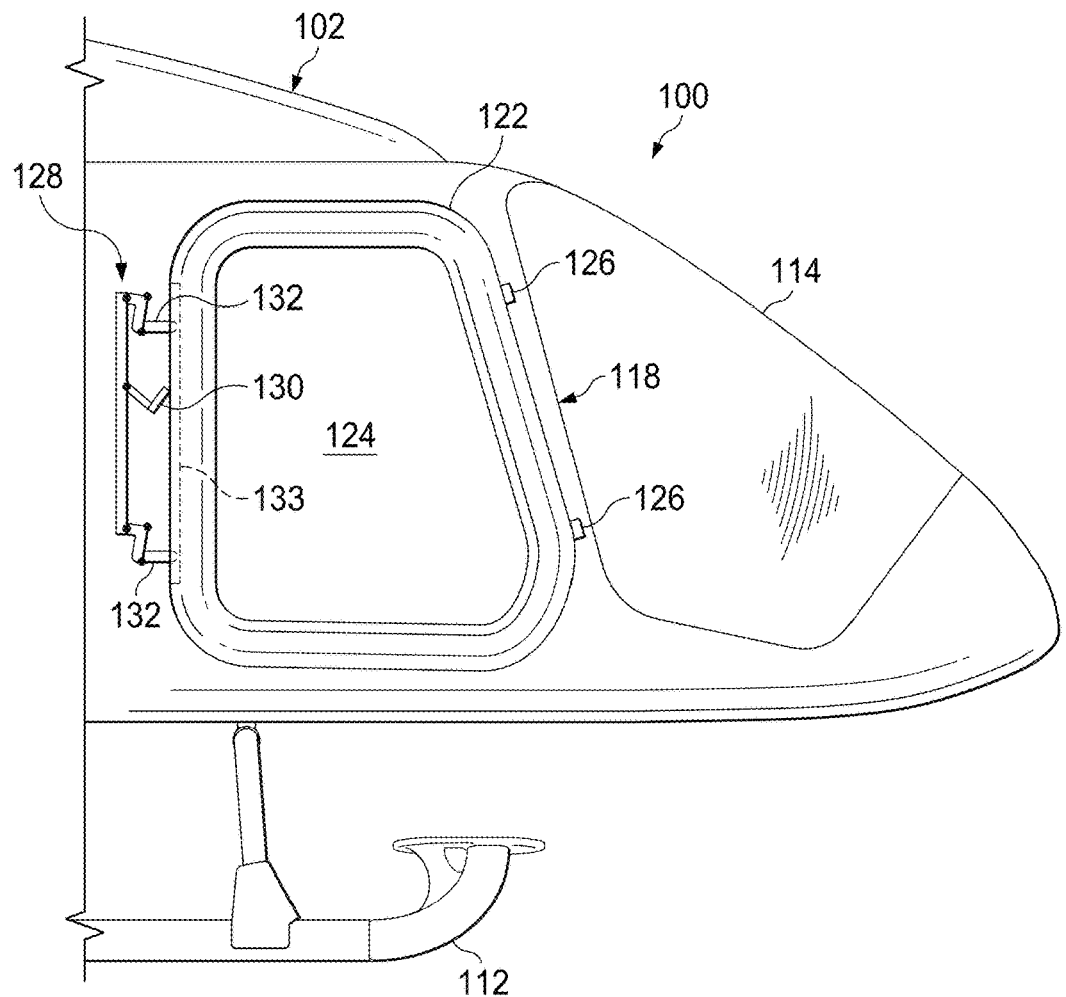
FIG. 2 is a side view of a portion of the aircraft of FIG. 1 according to this disclosure.

Referring now to FIG. 2, a side view of a portion of the aircraft 100 of FIG. 1 is shown according to this disclosure. Aircraft 100 is shown with the door 116 removed in order to show at least a portion of an airframe 122 of aircraft 100. The airframe 122 may generally comprise the structural framework of the aircraft 100 configured to provide structural rigidity to the fuselage 102 of the aircraft 100. In the embodiment shown, a portion of the airframe 122 substantially encapsulates, borders, and/or surrounds an opening 124 into the fuselage 102 that allows ingress and egress into the interior of the aircraft 100 when door 116 is in an open position or is removed. Additionally, in embodiments comprising a plurality of doors 116, it will be appreciated that the airframe 122 may encapsulate, border, and/or surround multiple openings 124 associated with the multiple doors 116. Accordingly, as will be discussed later herein in more detail, when door 116 is closed, door 116 interfaces with the portion of the airframe 122 that surrounds the opening 124 in order to cover the opening 124 and collectively form a seal, which may be fluid tight, between the interior of the aircraft 100 and the outside environment.

Aircraft 100 also comprises a plurality of hinge supports 126 disposed on a forward, outer portion of the airframe 122 and/or fuselage 102 in close proximity to the windshield 114 of the aircraft 100. The hinge supports 126 are configured to attach the door 116 to the aircraft 100, while allowing the door 116 to open outward, swinging in a forward or rearward and/or upward or downward direction, in order to allow access to the fuselage 102 and/or interior of the aircraft 100. Aircraft 100 further comprises a door mechanism 128 that may be mounted to the airframe 122 and/or other portion of the fuselage 102. Door mechanism 128 includes a door latch 130 coupled mechanically, electrically, and/or hydraulically to a plurality of locking pins 132. As such, selective operation of the door mechanism 128 causes locking pins 132 to engage and disengage the door 116 to secure the door 116 in a closed position relative to the airframe 122 and/or the aircraft 100. Furthermore, to further enhance the seal between the door 116 and the airframe 122, in some embodiments, aircraft 100 may comprise a flexible seal 133 (e.g. foam, rubber, silicon, thermoplastic elastomer (TPE), etc.) at the rearward portion of the airframe 122 and/or opening 124 that engages with the door 116 (or door frame 134 of FIG. 3) when the door 116 is closed on the aircraft 100.

Figure 3:
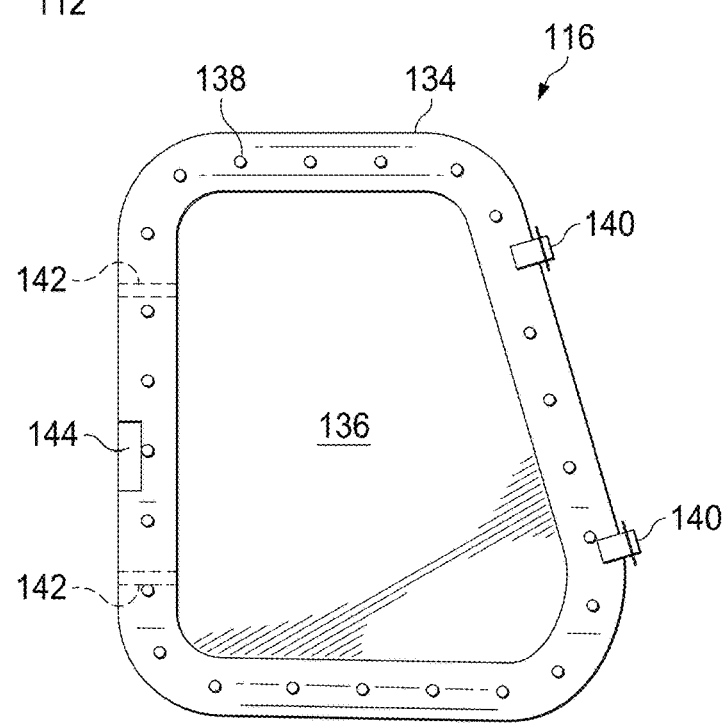
FIG. 3 is a side view of a door of the aircraft of FIG. 1 according to this disclosure.

Referring now to FIG. 3, a side view of the door 116 of the aircraft 100 of FIG. 1 is shown according to this disclosure. Door 116 generally comprises a door frame 134 and a window 136 secured to the door frame 134 by a plurality of fasteners 138 that extend through the window 136 and into the door frame 134. The window 136 may generally comprise a substantially similar size and/or overall footprint as the door frame 134 and be formed from see-through material (e.g. glass, Lexan, etc.). Door 116 also comprises a plurality of hinges 140. Hinges 140 are secured to a forward portion of the door frame 134 and are configured to interface with the hinge supports 126 coupled to the forward, outer portion of the airframe 122 of the aircraft 100. As such, the hinges 140 cooperate with the hinge supports 126 to attach the door 116 to the aircraft 100 while allowing the door 116 to open outward, swinging in a forward or rearward and/or upward or downward direction, in order to allow access to the interior of the fuselage 102 of the aircraft 100.

The door frame 134 also comprises a plurality of locking pin holes 142 disposed at least partially through the door frame 134. The locking pin holes 142 are configured to receive the locking pins 132 of the door mechanism 128 to lock the door 116 in the closed position. As such, selective operation of the door mechanism 128 causes locking pins 132 to engage and disengage the locking pin holes 142 to secure the door 116 in a closed position relative to the airframe 122 and/or the aircraft 100. Door frame 134 also comprises a slot 144 formed in a portion of the door frame 134. The slot 144 may be in the form of a recess in the door frame 134 that allows access to the door latch 130 of the door mechanism 128 and/or a separate auxiliary latch coupled to the door mechanism 128 and/or the door latch 130. Thus, via the slot 144, a user may selectively operate the door mechanism 128 from outside the aircraft 100 to cause the locking pins 132 to engage and disengage the locking pin holes 142 to lock and unlock the door 116, respectively. However, in alternative embodiments, the door frame 134 may not comprise a slot 144, and the door latch 130 may be disposed on an outer portion of the door 116.

Figure 4:
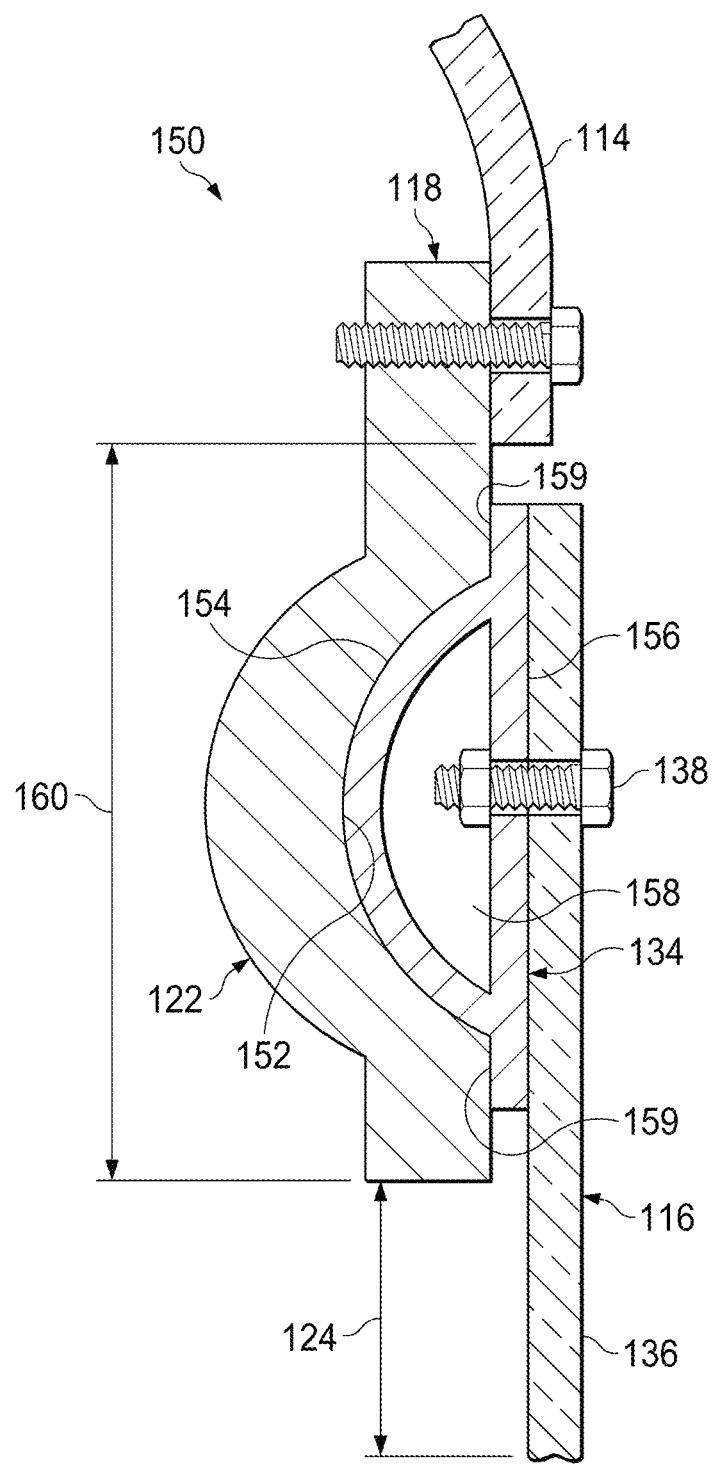
FIG. 4 is a cross-sectional view of a door interface according to this disclosure.

Referring now to FIG. 4, a cross-sectional view of a door interface 150 is shown according to this disclosure. In some embodiments, the airframe 122 may comprise an at least partially hollow structure. However, in the shown embodiment, the airframe 122 comprises a solid structure. To form the door interface 150, airframe 122 comprises a concavity 152 that extends at least along the entirety of the pillar 118, which is the forward portion of the airframe 122 that is adjacent to the windshield 114. However, in some embodiments, the concavity 152 may extend along the top, bottom, and/or rearward sides of the portion of the airframe 122 that forms the opening 124. Still further, in some embodiments, the concavity 152 may extend along the entirety of the portion of the airframe 122 that forms the opening 124. In the shown embodiment, the concavity 152 comprises a substantially rounded, concave profile. However, in some embodiments, concavity 152 may comprise a hemispherical and/or substantially U-shaped profile.

To further form the door interface 150, the door frame 134 generally comprises a substantially complementary profile 154 to the concavity 152 of the airframe 122, such that the complementary profile 154 of the door frame 134 is at least partially received within the concavity 152 of the airframe 122. Accordingly, in the shown embodiment, the complementary profile 154 comprises a substantially protruding, rounded, convex profile. However, in some embodiments, the complementary profile 154 may comprise a protruding hemispherical and/or substantially U-shaped profile that substantially corresponds to the profile of the concavity 152. The door frame 134 comprises an at least partially hollow structure. As such, a channel 158 is formed between the complementary profile 154 and an outer surface 156 of the door frame 134. The outer surface 156 provides a flat mounting surface for the window 136, while the fasteners 138 retaining the window 136 extend through the window 136 and the outer surface 156 at least partially into the channel 158. In some embodiments, the complementary profile 154 and the channel 158 may extend along the entirety of the forward portion of the door frame 134 that is adjacent o the forward portion of the airframe 122 and the windshield 114 (pillar 118). However, in some embodiments, the complementary profile 154 and the channel 158 may extend along the top, bottom, and/or rearward sides of the door frame 134. Still further, in some embodiments, the channel 158 may extend along the entirety of the door frame 134. Additionally, in some embodiments, the outer surface 156 may extend beyond the complementary profile 154 to form tabs 159 on each end of the outer surface 156, which may contact complementary flat portions of the airframe 122.

The door interface 150 is formed between the complementary profile 154 of the door frame 134 and the concavity 152 of the airframe 122 when the complementary profile 154 is at least partially received within the concavity 152 and substantially abuts, contacts, and/or interfaces with the concavity 152 when the door 116 is moved to its closed position to collectively form a seal between the interior of the aircraft 100 and the outside environment. As such, it will be appreciated that the complementary profile 154 is disposed about the door frame 134 in locations corresponding to the concavity 152 in the airframe 122, such that the complementary profile 154 and the concavity 152 may interface when the door 116 is moved to its dosed position. The door interface 150 comprises an overlapping spatial relationship between the airframe 122 and the door frame 134 with respect to a length of the aircraft 100, thereby forming tongue-and-groove style seal. As a result of the overlapping, tongue-and-groove configuration of the door interface 150 between the complementary profile 154 of the door frame 134 and the concavity 152 of the airframe 122, door interface 150 provides a tighter seal that may reduce leakage of air and/or precipitation into the interior of the aircraft 100 as compared to traditional door-to-frame interfaces.

Additionally, as compared to an airframe 122 and door frame 134 disposed adjacently in a side-by-side relationship along the length of a current aircraft 100, the overlapping, tongue-and-groove configuration of the door interface 150 reduces the obstruction width 160 (defined as distance between the most rearward edge of windshield 114 along the pillar 118 and the most forward visible, non-obstructed view through window 136) of the overall pillar 118 by superimposing the complementary profile 154 of the door frame 134 within the concavity 152 of the airframe 122. As such, the reduced obstruction width 160 resulting from the door interface 150 increases the visibility of a pilot of aircraft 100 since the total structure of pillar 118 that impairs visibility is reduced. Thus, door interface 150 may increase visibility by at least about 50%. For example, door interface 150 may provide aircraft 100 with an obstruction width 160 of about 4.50 inches, whereas an airframe 122 and door frame 134 disposed adjacently in a side-by-side relationship may provide an obstruction width 160 that may exceed 9.00 inches. Furthermore, door interface 150 increases the structural rigidity of aircraft 100, while potentially reducing the weight of aircraft 100. This is due, at least in part, to the superimposed door frame 134 and airframe 122 functioning as a unitary, layered structural component as opposed to two separate components disposed in a side-by-side configuration, which may allow relative motion between the separate components.

Figure 5:
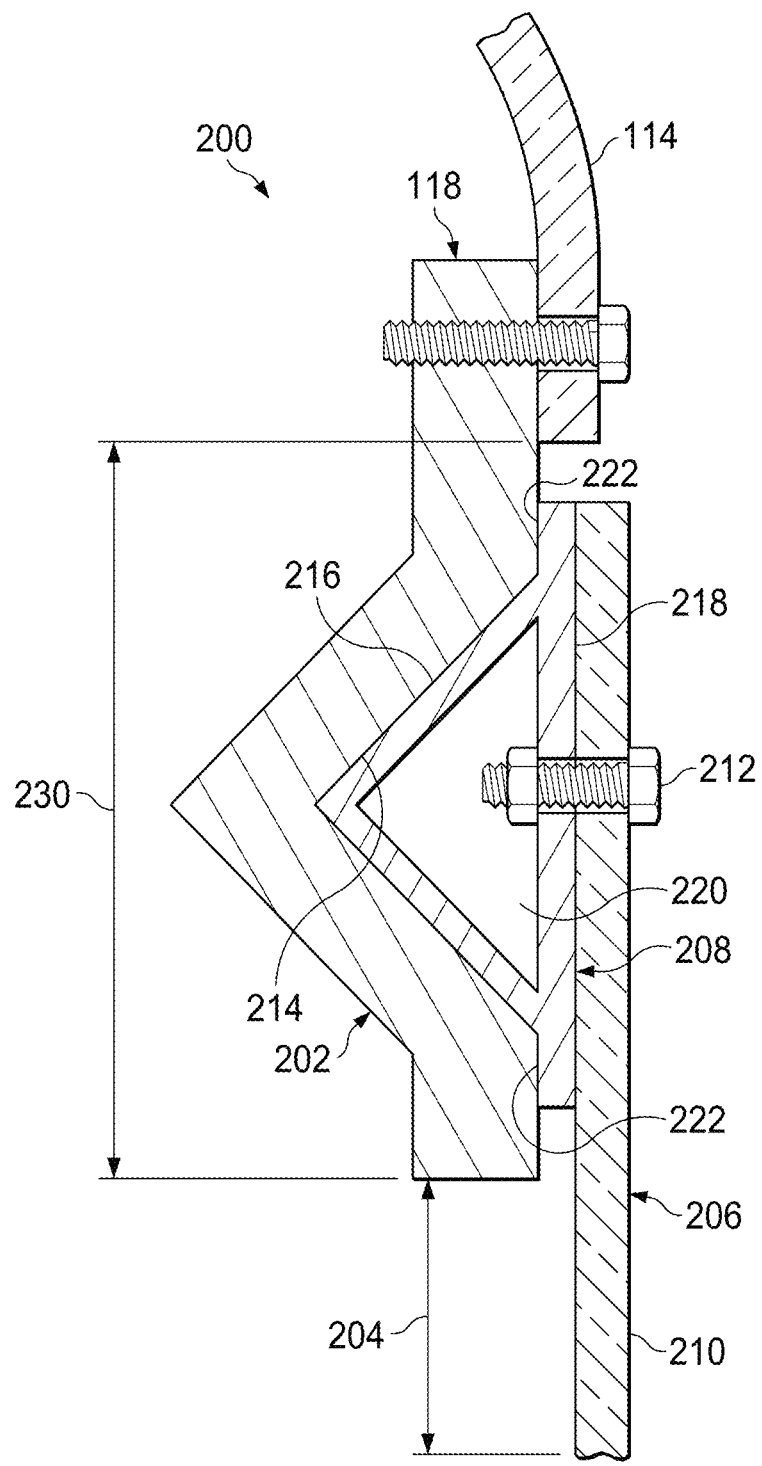
FIG. 5 is a cross-sectional view of another embodiment of a door interface according to this disclosure.

Referring now to FIG. 5, a cross-sectional view of another embodiment of a door interface 200 is shown according to this disclosure. It will be appreciated that door interface 200 may be substantially similar to door interface 150 of FIGS. 1-4 and function in a substantially similar manner to door interface 150 of FIGS. 1-4. Door interface 200 comprises an airframe 202 that forms an opening 204, a door 206 comprising a door frame 208, and a window 210 secured to the door frame 208 by a plurality of fasteners 212. However, in this embodiments, airframe 202 comprises a concavity 214 comprising a substantially V-shaped profile. In other embodiments, concavity 214 may comprise a substantially rectangular, hexagonal, and/or octagonal profile.

Door frame 208 comprises a substantially complementary profile 216 to the concavity 214 of the airframe 202, such that the complementary profile 216 of the door frame 208 is at least partially received within the concavity 214 of the airframe 202. Accordingly, in this embodiment, complementary profile 216 comprises a protruding, substantially V-shaped profile. However, in other embodiments, the complementary profile 216 may comprise a protruding rectangular, hexagonal, and/or octagonal profile that substantially corresponds to the profile of the concavity 214. Similarly to door interface 150, door frame 208 also comprises an at least partially hollow structure. Accordingly, a channel 220 is formed between the complementary profile 216 and an outer surface 218 of the door frame 208. The outer surface 218 provides a flat mounting surface for the window 210, while the fasteners 212 retaining the window 210 extend through the window 210 and the outer surface 218 at least partially into the channel 220. Additionally, in some embodiments, the outer surface 218 may extend beyond the complementary profile 216 to form tabs 222 on each end of the outer surface 218, which may contact complementary flat portions of the airframe 202.

Door interface 200 is formed between the complementary profile 216 of the door frame 208 and the concavity 214 of the airframe 202 when the complementary profile 216 is at least partially received within the concavity 214 and substantially abuts, contacts, and/or interfaces with the concavity 214 when the door 206 is moved to its closed position to collectively form a seal between the interior of the aircraft 100 and the outside environment. Further, it will be appreciated that door interface 200 comprises an overlapping, tongue-and-groove configuration between the complementary profile 216 of the door frame 208 and the concavity 214 of the airframe 202, thereby providing a tighter seal that may reduce leakage of air and/or precipitation into the interior of the aircraft 100 as compared to traditional door-to-frame interfaces. Further, door interface 200 may also reduce the obstruction width 230 of the overall pillar 118 by superimposing the complementary profile 216 of the door frame 208 within the concavity 214 of the airframe 202, thereby increasing visibility of a pilot of aircraft 100 by at least about 25%, at least about 30%, at least about 40%, at least about 50%, and/or at least about 60%. Furthermore, door interface 200 also increases the structural rigidity of aircraft 100 in a substantially similar manner as door interface 150.

It will be appreciated that the shape of the airframe 122, 202, opening 124, 204, door frame 134, 208, and window 136, 210 may be sized according to the specific application intended to optimize the size of the opening 124, 204 and/or the amount of visibility through window 136, 210. As such, while aircraft 100 is depicted as helicopter, it will be appreciated that door interfaces 150, 200 may be used in any aircraft (e.g. fixed-wing aircraft, vertical takeoff and landing (VTOL) aircraft, etc.). Additionally, while door interfaces 150, 200 are disclosed in the context of an aircraft, door interfaces 150, 200 may also be used in any automobile, sea vessel, military vehicle or "manned" equipment, and/or any other vehicle and/or otherwise "manned" equipment in order to reduce obstruction, thereby increasing visibility while maintaining and/or increasing structural rigidity.

At least one embodiment is disclosed, and variations, combinations, and/or modifications of the embodiments) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations(e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An aircraft door interface, comprising:
a structural component configured to provide rigidity to an aircraft, wherein the structural component at least partially borders an opening into an interior of the aircraft, and wherein the structural component comprises a concavity adjacent to the opening; and
a door comprising a door frame and a window secured to the door frame, wherein at least a portion of the door frame comprises a complementary profile to the concavity, and wherein the complementary profile is configured to form a seal between the structural component and the door frame when the complementary portion is at least partially received within the concavity, the door frame comprising a hollow channel formed between the complementary profile and an outer surface of the door frame.

2. The aircraft door interface of claim 1, wherein the concavity and the complementary profile are disposed along a pillar of the aircraft.

3. The aircraft door interface of claim 2, wherein the concavity and the complementary profile are further disposed along at least a portion of one of the top, bottom, and rearward sides of the portion of the structural component that borders the opening.

4. The aircraft door interface of claim 1, wherein the complementary profile comprises at least one of a protruding convex profile, a V-shaped profile, and a rectangular shaped profile.

5. The aircraft door interface of claim 1, further comprising: a door mechanism comprising a door latch coupled to a plurality of locking pins, wherein selective operation of the door latch causes the plurality of locking pins to engage and disengage a plurality of associated locking pin holes disposed in the door frame.

6. The aircraft door interface of claim 1, wherein the complementary profile and the concavity form an overlapping, tongue-and-groove configuration.

7. The aircraft door interface of claim 1, wherein fasteners securing the window to the door frame extend through the window and the outer surface of the door frame and at least partially into the hollow channel.

8. The aircraft door interface of claim 1, wherein the aircraft door interface further comprises a flexible seal.

9. An aircraft, comprising:
a fuselage; and
an aircraft door interface, comprising:
an airframe configured to provide structural rigidity to the fuselage, wherein the airframe at least partially borders an opening into the fuselage, and wherein at least a portion of the airframe comprises a concavity adjacent to the opening; and
a door comprising a door frame and a window secured to the door frame, wherein at least a portion of the door frame comprises a complementary profile to the concavity of the airframe, and wherein the complementary profile is configured to form a seal between the airframe and the door frame when the complementary portion is at least partially received within the concavity, the door frame comprising a hollow channel formed between the complementary profile and an outer surface of the door frame.

10. The aircraft of claim 9, wherein the concavity and the complementary profile are disposed along a pillar of the aircraft.

11. The aircraft of claim 10, wherein the concavity and the complementary profile are further disposed along at least a portion of one of the top, bottom, and rearward sides of the portion of the frame that borders the opening into the fuselage.

12. The aircraft of claim 9, wherein the complementary profile comprises at least one of a protruding convex profile, a V-shaped profile, and a rectangular shaped profile.

13. The aircraft of claim 9, wherein fasteners securing the window to the door frame extend through the window and the outer surface of the door frame and at least partially into the hollow channel.

14. The aircraft of claim 9, further comprising: a plurality of hinge supports disposed on the airframe and a plurality of hinges disposed on the door frame, wherein the hinge supports are configured to interface with the hinges to attach the door to the airframe while allowing the door to open outward.

15. The aircraft of claim 14, wherein the aircraft door interface further comprises a flexible seal.

16. The aircraft of claim 9, further comprising: a door mechanism comprising a door latch coupled to a plurality of locking pins, wherein selective operation of the door latch causes the plurality of locking pins to engage and disengage a plurality of associated locking pin holes disposed in the door frame.

17. The aircraft of claim 16, wherein the door frame comprises a slot formed in a portion of the door frame that allows access to the door latch of the door mechanism.

18. The aircraft of claim 9, wherein the complementary profile and the concavity form an overlapping, tongue-and-groove configuration.

* * * * *